United States Patent [19]

Widener et al.

[11] 4,407,969

[45] Oct. 4, 1983

[54] FLEXIBLE REFRACTORY COMPOSITION

[75] Inventors: Joseph Widener, Belvedere, S.C.; James M. Britt, Martinez, Ga.; Steve A. LaPrade, North Augusta, S.C.

[73] Assignee: The Babcock & Wilcox Company, New Orleans, La.

[21] Appl. No.: 357,024

[22] Filed: Mar. 16, 1982

Related U.S. Application Data

[63] Continuation-in-part of Ser. No. 283,860, Jul. 16, 1981, abandoned.

[51] Int. Cl.³ .............................................. C04B 35/80
[52] U.S. Cl. ...................................................... 501/95
[58] Field of Search ........................................... 501/95

[56] References Cited

U.S. PATENT DOCUMENTS

| | | | |
|---|---|---|---|
| 3,682,667 | 8/1972 | Roberts et al. | 501/95 |
| 3,904,427 | 9/1975 | Hawthorne | 501/95 |
| 3,969,124 | 7/1976 | Stewart | 501/95 |
| 4,127,556 | 11/1978 | Ushitani et al. | 501/95 |
| 4,321,154 | 3/1982 | Ledru | 501/95 |

*Primary Examiner*—James Poer
*Attorney, Agent, or Firm*—Robert J. Edwards; J. H. Muetterties; Mark B. Quatt

[57] ABSTRACT

A flexible thermally insulative refractory composition resistant to molten material attack or penetration containing, in various combination, components of inorganic fiber, phenolic resin, latex, anionic and cationic polymers.

10 Claims, No Drawings

FLEXIBLE REFRACTORY COMPOSITION

This application is a continuation-in-part of U.S. Patent Application Ser. No. 283,860, filed July 16, 1981, now abandoned.

BACKGROUND OF THE INVENTION

The present invention relates to an improved refractory composition and, more particularly, to a flexible thermally insulative refractory composition suitable for use for the containment of molten material.

In the foundry industry, molds and stools are used for the production of metal ingots wherein molten metal is poured into a mold essentially consisting of a base and side walls, the makeup of which provides resistance to molten metal attack. The mold contains the molten material and, after casting and solidifying in the mold, the cast metal is removed from the mold and cleaned to the desired finished product.

Heretofore, sand and, more recently, rigid, compressed, fibrous, silica-alumina boards have been used to form the base and side walls of a metal mold and stool. One of the objects of the present invention is to provide a refractory composition that can be used to replace the sand and rigid, compressed, fibrous, silica-alumina boards. Accordingly, herein is provided a flexible thermally insulative refractory composition suitable for use in the foundry industry to contain molten metal.

The prior art above-mentioned rigid board, while sufficient for use as the base of a mold stool, has severe shortcomings when it is used as a mold or stool side wall, particularly when a rounded edge or rounded corner is encountered or desired. Use of rigid board to round an edge or corner would require scoring of the board at several places along the board at the location of a curve to be followed to give the board the needed flexibility for shaping to follow the desired path. Use of a rigid board to follow or form a curve requires additional labor to score the board thus increasing labor and overall installation costs. Additionally, scoring results in undesirable ingot surface imperfections which require additional labor for removal. However, the most severe problem associated with board scoring is the creation of seams along the curve. The seams so created form weak points along the wall that often allow undesirable metal penetration leading to metal loss, metal contamination, irregular product shape, shortening mold use life, and potential hazard to health.

The present invention overcomes many of the shortcomings of the prior art rigid board. The refractory composition of the present invention is flexible, having a bend radius of at least 3 inches, and therby eliminates the need for scoring to round an edge or follow a curve. Use of the inventive flexible composition provides for fewer mold seams, reduces labor costs, affords greater ease in installation, and virtually eliminates metal penetration along curved surfaces.

SUMMARY OF THE INVENTION

The present invention relates to a flexible thermally insulative refractory composition suitable for use for the containment of molten material. A typical composition would include approximately, in percentage by dry weight, 70 to 90% of an inorganic fiber and from 10 to 30% of a material selected from the group consisting of asphalt, carbon black, graphite, silicon carbide, and furan resin. Another composition would include approximately, in percentage by dry weight, 70 to 85% of an inorganic fiber, 10 to 25% of a material selected from the group consisting of asphalt, carbon black, graphite, silicon carbide, and furan resin, and 2 to 10% of a phenolic resin. This last named composition could further include 2 to 12% of a latex or in combination 0.02 to 4% of an anionic polymer and 0.5 to 4% of a cationic polymer; additionally, it could include both the latex and the polymers in the percentage specified. In addition, a suitable flexible thermally insulative refractory composition is obtained by including in dry weight percentages, 70–85% of an inorganic fiber, 2 to 10% of a phenolic resin, 5–15% of a latex, 0.5 to 5% of an anionic polymer and 0.5 to 3.5% of a cationic polymer. The inorganic fiber component of the compositions is essentially alumina-silica, mineral wool, glass or asbestos.

The various features of novelty which characterize the invention are pointed out with particularity in the claims annexed to and forming a part of this disclosure. For a better understanding of the invention, its operating advantages and specific results obtained by its use, which there is illustrated and described a typical embodiment of the invention.

DETAILED DESCRIPTION OF THE PREFERRED EMBODIMENT

The predominant component of the flexible thermally insulative refractory composition of the present invention, suitable for use for the containment of molten material, is an inorganic fiber and, more particularly, a fiber that is essentially alumina-silica, mineral wool, glass or asbestos. The second main ingredient is a carbonaceous component selected from the group consisting of asphalt, carbon black, graphite, silicon carbide and furan resin. The composition can also include phenolic resin, latex, and anionic and cationic polymers and combinations thereof. However, when a phenolic resin, latex and anionic and cationic polymers are used with the inorganic fiber it has been found that a suitable refractory composition is obtained without the addition of a carbonaceous component.

The inorganic fiber component of the composition can range, in approximate percentage by dry weight, from 70 to 90% with the carbonaceous component ranging, in approximate percentage by dry weight, from 10 to 30% wherein the carbonaceous component is selected from the group consisting of asphalt, carbon black, graphite, silicon carbide and furan resin. The fiber component, namely, alumina-silica, mineral wool, glass, or asbestos and the carbonaceous component are commercially readily available. The desired product can be achieved by limiting the components to inorganic fiber and carbonaceous material.

A typical composition would comprise, in approximate percentage by dry weight, 70 to 85% of an inorganic fiber, 10 to 25% of a material selected from the group consisting of asphalt, carbon black, graphite, silicon carbide, and furan resin, and 2 to 10% of a phenolic resin. The composition could further include, in approximate percentage by dry weight, 2 to 12% of latex component or 0.02 to 4% of an anionic polymer and 0.5 to 4% of a cationic polymer. Additionally, a suitable composition could include in combination with 70–85% of the inorganic fiber, 2 to 10% of phenolic resin, 5–15% of latex, 0.5–5% of an anionic polymer and 0.5 to 3.5% of a cationic polymer. The latex and polymers, both anionic and cationic, are also readily available commercially.

A preferred composition would include, in approximate percentage by dry weight, 70 to 80% of an inorganic fiber, 10 to 15% of a material selected from the group consisting of asphalt, carbon black, graphite, silicon carbide, and furan resin, 4 to 6% of a phenolic resin, 5 to 10% of a latex, 0.5 to 4% of an anionic polymer and 0.5 to 2.5% of a cationic polymer.

The composition can be made by mixing the selected components in water to form a slurry followed by dewatering, shaping, drying and curing. Typically, and by way of example, the preferred composition has been selected for illustration only, the slurry can be obtained by mixing in water the selected fiber component, carbonaceous component, phenolic resin, latex, and anionic and cationic polymers. The slurry mixing step is followed by the making of a fiber mat achieved by removing water from the slurry while forming the fiber mat into a desired shaped composition. The mat forming step is followed by a drying and curing step wherein substantially all of the remaining moisture is removed from the composition to attain the desired flexible thermally insulative refractory product. Curing typically is accomplished at a temperature in the range of from approximately 250° to about 400° F. The finished product would be flexible when curing is accomplished in the 250° to 400° F. range with the flexibility of the composition being somewhat less when curing is accomplished above 300° F.

A composition can be made of 70 to 90% inorganic fibers and 10 to 30% carbonaceous component. A composition of this type can successfully be used to contain molten metal, specifically, poured molten metal. The fiber content provides strength, flexibility and the combined metal temperature and metal penetration resistance, whereas the carbonaceous component keeps the molten metal from adhering to, reacting with or penetrating the composition. Phenolic resin can be added to the composition, lowering the fiber and carbonaceous component percentages, to strengthen the composition to allow for molten metal impingement on the composition surface. The polymers can be added to the composition to disperse then flocculate the solids to the fiber to obtain a homogeneous dispersion of solids onto the fiber. Latex can be added as a component to provide for more flexibility and can impart enough flexibility to the composition so that the composition might be used for a circular or cylindrical molten metal containing shape.

The inventive composition finds particular application in the foundry industry wherein a flexible thermally insulative refractory composition is desired for use for the containment of molten metal with temperatures up to approximately 2600° F. The composition finds application for use as mold walls, mold stool bases, lining for ladles riser sleeves, and additionally may be used in situations where an asbestos replacement is contemplated. The composition achieves its objective, that is, resisting molten metal attack or penetration, namely, when the molten metal contacts the composition, carbonization occurs wherein a barrier is established at the composition-metal interface that prevents the molten metal from further wetting the composition and thereby effectively contains the molten material.

Several tests were conducted utilizing compositions composed of compounds in the ranges specified. The following non-limiting examples are given in order to illustrate the invention. The composition compounds are all in approximate percentage by dry weight.

EXAMPLE 1

The composition constituted 83.1% alumina-silica fiber, 13.5% asphalt, 3% phenolic resin, 0.4% cationic polymer and 0.05% anionic polymer. The composition lined the inside surface of a steel sleeve and aluminum nails were used to fix the composition to the sleeve. The composition was also used as the base of the sleeve to simulate a mold stool. Molten iron alloy in the 2300° to 2400° F. range was poured into the sleeve, cooled and the resulting ingot was removed. The mold stool effectively contained the molten metal and the ingot was stripped without an appreciable amount of fiber adhering to the ingot.

EXAMPLE 2

The composition constituted 83.1% alumina-silica fiber, 13.5% asphalt, 3% phenolic resin, 0.4% cationic polymer and 0.03% anionic polymer. The testing was conducted essentially as specified in EXAMPLE 1. The mold stool contained the metal and the ingot stripped clean, that is, no fiber adhered to the ingot.

EXAMPLE 3

The composition constituted 78.4% alumina-silica fiber, 21.1% asphalt, 0.5% cationic polymer and 0.02% anionic polymer. The testing was essentially conducted as specified in EXAMPLE 1 but adhesive tape was used instead of aluminum nails. The mold stool contained the metal and the ingot stripped with only minor fiber sticking.

EXAMPLE 4

The composition constituted 72.9% alumina-silica, 11.8% asphalt, 4.6% phenolic resin, 2.2% cationic polymer, 3.7 anionic polymer, and 4.8% latex. The testing was conducted essentially as specified in EXAMPLE 1. The mold stool contained the metal and the ingot stripped with only slight fiber sticking.

EXAMPLE 5

The composition constituted 73.8% alumina-silica fiber, 11.9% asphalt, 2.3% phenolic resin, 2% cationic polymer, 3.8% anionic polymer, and 6.2% latex. The testing proceeded as in EXAMPLE 1, the mold stool contained the metal and the ingot stripped with slight fiber sticking.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without corresponding use of the other features.

EXAMPLE 6

The composition constituted 79.2% alumina-silica fiber, 4.4% phenolic resin, 9.8% latex, 4.4% anionic polymer and 2.2% cationic polymer. The composition lined the inside surface of a steel sleeve and adhesive tape was used to fix the composition to the sleeve. The composition was also used at the base of the sleeve to simulate a mold stool. Molten iron alloy in the 2300° to 2400° F. range was poured into the sleeve, cooled and the resulting ingot was removed. The mold stool effectively contained the molten metal and the ingot was stripped clean, that is, no fiber adhered to the ingot.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without corresponding use of other features.

The embodiments of the invention in which an exclusive property or privilege is claimed are defined as follows:

1. A flexible thermally insulative refractory composition suitable for use for the containment of molten material comprising, in approximate percentage by dry weight, 70 to 90% of an inorganic fiber and 10 to 30% of a material selected from the group consisting of asphalt, carbon black, graphite, silicon carbide, and furan resin.

2. A flexible thermally insulative refractory composition suitable for use for the containment of molten material comprising, in approximate percentage by dry weight, 70 to 85% of an inorganic fiber, 10 to 25% of a material selected from the group consisting of asphalt, carbon black, graphite, silicon carbide, and furan resin, and 2 to 10% of a phenolic resin.

3. The refractory composition according to claim 2 further including 2 to 12% of a latex.

4. The refractory composition according to claim 2 further including 0.02 to 4% of an anionic polymer and 0.5 to 4% of a cationic polymer.

5. A flexible thermally insulative refractory composition suitable for use for the containment of molten material comprising, in approximate percentage by dry weight, 70 to 85% of an inorganic fiber, 2 to 10% of a phenolic resin, 5 to 15% of a latex, 0.5 to 5% of an anionic polymer and 0.5 to 3.5% of a cationic polymer.

6. A flexible thermally insulative refractory composition suitable for use for the containment of molten material comprising, in approximate percentage by dry weight, 70 to 80% of an inorganic fiber, 10 to 15% of a material selected from the group consisting of asphalt, carbon black, graphite, silicon carbide, and furan resin, 4 to 6% of a phenolic resin, 5 to 10% of a latex, 0.5 to 4% of an anionic polymer and 0.5 to 2.5% of a cationic polymer.

7. The refractory composition according to claims 1, 2, or 6 wherein said inorganic fiber is essentially alumina-silica fiber.

8. The refractory composition according to claim 1, 2 or 6 wherein said inorganic fiber is mineral wool.

9. The refractory composition according to claim 1, 2 or 6 wherein said inorganic fiber is glass.

10. The refractory composition according to claim 1, 2 or 6 wherein said inorganic fiber is asbestos.

* * * * *